(12) United States Patent
Kim et al.

(10) Patent No.: US 8,368,953 B2
(45) Date of Patent: Feb. 5, 2013

(54) IMAGE FORMING DEVICE AND METHOD THEREOF

(75) Inventors: Gun-ho Kim, Seoul (KR); Hyou-jin Kim, Anyang-si (KR); Bum-kwon Kang, Suwon-si (KR); Hyo-joon Bae, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1081 days.

(21) Appl. No.: 12/136,897

(22) Filed: Jun. 11, 2008

(65) Prior Publication Data
US 2009/0027703 A1    Jan. 29, 2009

(30) Foreign Application Priority Data

Jul. 27, 2007  (KR) .................. 10-2007-0075675
Aug. 2, 2007  (KR) .................. 10-2007-0077871

(51) Int. Cl.
*G06F 15/00*    (2006.01)

(52) U.S. Cl. ............. 358/1.9; 350/515; 399/223
(58) Field of Classification Search ............ 358/1.9, 358/515; 399/223
See application file for complete search history.

(56) References Cited

U.S. PATENT DOCUMENTS

2001/0021322 A1* 9/2001 Tsuruya et al. ............ 399/223
2005/0134874 A1* 6/2005 Overall et al. ............. 358/1.9

FOREIGN PATENT DOCUMENTS

JP    2006-201341    8/2006

* cited by examiner

*Primary Examiner* — Twyler Haskins
*Assistant Examiner* — Michael Burleson
(74) *Attorney, Agent, or Firm* — Stanzione & Kim, LLP

(57) ABSTRACT

An image forming device having a plurality of developing units is provided. The image forming device includes a control unit to determine whether to perform an auto color registration (ACR) with respect to one or more of the plurality of developing units, and a print engine unit to perform an ACR of the determined developing units.

33 Claims, 11 Drawing Sheets

IMAGE FORMING DEVICE AND METHOD THEREOF

CROSS-REFERENCE TO RELATED APPLICATIONS

This application claims priority under 35 U.S.C. §119(a) from Korean Patent Application Nos. 10-2007-75675 and 10-2007-77871, filed Jul. 27, 2007 and Aug. 2, 2007, in the Korean Intellectual Property Office, the entire disclosure of which are incorporated herein by reference.

BACKGROUND OF THE INVENTION

1. Field of the Invention

The present general inventive concept relates to an image forming device and a method thereof. More particularly, the present general inventive concept relates to an image forming device and a method thereof, which can perform an auto color registration through an efficient use of a plurality of developing units.

2. Description of the Related Art

With the development of electronic technology, peripheral devices, such as a printer, a scanner, and so forth, in addition to a computer, have been actively spread. Recently, color laser printers rather than dot printers or inkjet printers have been actively spread. The color laser printer generally expresses a color image by using toners of four colors, i.e., cyan (C), magenta (M), yellow (Y), and black (K). In order to print a clear image, the color laser printer performs the printing work by toner colors using four organic photoconductive drums (OPC drums). Also, in order to locate the respective color toners at correct positions, a transferring process is performed using a paper transfer belt (PTB) or an intermediate transfer belt (ITB).

On the other hand, in order to express the colors, the toners should be accurately superimposed and transferred to a same position using a plurality of OPC drums and transfer machines. However, as the printing work is continuously performed, the color registration of the color laser printer may be distorted. Accordingly, in order to maintain the quality of an image, it is required to perform an auto color registration (ACR).

An ACR is a correction method for matching relative positions of four colors of CMYK to one another in performing the print work. That is, the ACR is a technique that greatly affects the image quality of the color laser printer, and the image quality becomes better as the ACR is performed in larger quantities and more frequently.

However, when one of C, M, Y, or K developing units has not been installed or toner has been consumed in the image forming device, an error called "CRUM Not Installed" or "Toner Empty Error" occurs. As a result, the print work cannot be performed, or an error occurs during the ACR operation, so that the ACR or printing is not properly performed.

In addition, even in a special case where a user does not desire the use of a specified color, the printing or the ACR is performed with all colors, and this causes an unnecessary consumption of toner.

In addition, in order to perform the ACR once, a specified quantity of toner and time for performing the ACR are required, and thus too frequent performing of the ACR is inefficient. Also, an amount of waste toner is increased due to frequent performing of the ACR.

If an ACR execution condition is satisfied, the conventional image forming device necessarily performs the ACR work. In this case, if the residual quantity of toner is not sufficient, it is impossible to perform an accurate ACR. This causes an unnecessary waste of toner and time.

SUMMARY OF THE INVENTION

The present general inventive concept provides an image forming device and a method thereof, which can perform an auto color registration (ACR) and printing without leaving an error message even if any one of a plurality of developing units is not installed or a residual quantity of toner in any one of the plurality of developing units is below a predetermined threshold value.

The present general inventive concept also provides an image forming device and a method thereof, which do not perform an ACR if the ACR is not necessary or if the failure possibility is high.

The present general inventive concept also provides an image forming device and a method thereof, which can improve the user's range of options by enabling a user to decide whether to perform an ACR when the residual quantity of toner is insufficient.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming device and a method thereof, which can receive in advance any color the use of which is not desired by a user and perform an ACR and printing only with the remaining colors without performing an ACR and printing with respect to the color not desired by the user.

The foregoing and/or other aspects and utilities of the present general inventive concept may also be achieved by providing an image forming device having a plurality of developing units, including a control unit to determine whether to perform an auto color registration (ACR) with respect to one or more of the plurality of developing units, and a print engine unit to perform an ACR of the determined developing units.

The control unit may determine whether to perform an ACR of the respective developing units by confirming at least one of a user's selection of the one or more developing units and a residual quantity state of toner of the plurality of developing units.

The image forming device may further include a judgment unit to judge whether printing of an ACR pattern for the respective developing units is possible by confirming the residual quantities of toner of the respective developing units, and reporting a result of judgment to the control unit.

The image forming device may further include an input unit to receive developer information the color of which is not to be used during the ACR with respect to the respective developing units and reporting the received developer information to the control unit.

The image forming device may further include a judgment unit to judge whether printing of an ACR pattern is possible by confirming at least one of the residual quantities of toner of the respective developing units and an attachment/detachment state of the respective developing units, and reporting a result of judgment to the control unit, and the input unit may provide a user interface (UI) to inquire whether to perform an ACR using only the printable developing units, when it is confirmed by the judgment unit that the developing unit is in an unprintable state.

The image forming device may further include a condition judgment unit to judge whether an ACR execution condition is satisfied.

The print engine unit can perform a printing work using only the printable developing units when a print command is inputted.

In the above-described embodiments of the present general inventive concept, the image forming device may comprise four or more developing units.

The foregoing and/or other aspects and utilities of the present general inventive concept may also be achieved by providing an image forming device, including a judgment unit to judge whether an auto color registration (ACR) pattern is normally outputted by confirming information on residual quantities of toner; and a color registration processing unit to perform an ACR work when it is judged that the ACR pattern is normally outputted.

The image forming device may further include a control unit to judge whether a predefined ACR execution condition is satisfied and controlling the judgment unit to judge whether the ACR pattern is normally outputted when the ACR execution condition is satisfied.

The image forming device may further include a storage unit to store the information on the residual quantities of toner.

The color registration processing unit may perform the ACR using a density pattern and the ACR pattern.

The color registration processing unit may perform a color registration using a previous color registration adjustment value when it is judged that the normal output of the ACR pattern is impossible.

The color registration processing unit may end the ACR when an ACR stop command is inputted from a user in a state that the normal output of the ACR pattern is judged to be impossible.

The judgment unit judges that the normal output of the ACR pattern is possible when the residual quantity of toner confirmed through the information is above a predetermined threshold value, while it judges that the normal output of the ACR pattern is impossible when the residual quantity of toner is below the threshold value.

The image forming device may further include a user interface unit to provide a user interface window to inquire whether to perform the ACR when it is judged that the normal output of the ACR pattern is impossible.

The image forming device may further include an interface unit to provide a user interface window to inquire whether to perform the ACR to a host PC when it is judged that the normal output of the ACR pattern is impossible.

The color registration processing unit may check a toner density by outputting a density pattern to a transfer belt when it is judged that the normal output of the ACR pattern is possible, and perform the ACR work by outputting the ACR pattern when the toner density is above a predetermined threshold density value, while it performs a color registration using a previous color registration adjustment value when the toner density is below the threshold density value.

The foregoing and/or other aspects and utilities of the present general inventive concept may also be achieved by providing an image forming method for an image forming device having a plurality of developing units, including determining whether to perform an auto color registration (ACR) with respect to one or more of the plurality of developing units, and performing an ACR of the determined developing units.

The determining operation may comprise determining whether to perform an ACR of the one or more developing units by confirming at least one of a user's selection of the plurality of developing units and a residual quantity state of toner of the plurality of developing units.

The image forming method may further include judging whether printing of an ACR pattern for the respective developing units is possible by confirming the residual quantities of toner of the respective developing units.

The image forming method may further include providing a user interface (UI) to inquire whether to perform an ACR using only the printable developing units when the developing unit that is in an unprintable state is confirmed.

The image forming method may further include receiving developer information the color of which is not to be used during the ACR with respect to the respective developing units.

The image forming method may further include judging a condition whether an ACR execution condition is satisfied.

The performing operation may include performing a printing work using only the determined developing units when a print command is inputted.

In the above-described embodiments of the present general inventive concept, the plurality of developing units may comprise four or more developing units.

The foregoing and/or other aspects and utilities of the present general inventive concept may also be achieved by providing an image forming method, including confirming whether an auto color registration (ACR) execution condition is satisfied, confirming residual quantities of toner, and judging whether an ACR pattern is normally outputted according to a result of confirming the residual quantities of toner.

The image forming method according to embodiments of the present general inventive concept may further comprise performing an ACR.

The performing of the ACR may include performing the ACR using a density pattern and the ACR pattern.

The confirming of the residual quantities of toner may include confirming the residual quantities of toner when the ACR execution condition is satisfied.

The image forming method may further include performing a color registration using a previous color registration adjustment value when it is judged that the normal output of the ACR pattern is impossible.

The image forming method may further include ending the ACR when an ACR stop command is inputted from a user in a state that the normal output of the ACR pattern is judged to be impossible.

The judging operation may include judging that the normal output of the ACR pattern is possible when the residual quantity of toner confirmed through the information is above a predetermined threshold value, while judging that the normal output of the ACR pattern is impossible when the residual quantity of toner is below the threshold value.

The image forming method may further include providing a user interface window to inquire whether to perform the ACR when it is judged that the normal output of the ACR pattern is impossible.

The providing of the user interface window may include providing the user interface window on a display of the image forming device or a host PC.

The performing of the ACR may include checking a toner density by outputting a density pattern to a transfer belt when it is judged that the normal output of the ACR pattern is impossible; and performing the ACR work by outputting the ACR pattern when the toner density is above a predetermined threshold density value, while performing a color registration using a previous color registration adjustment value when the toner density is below the threshold density value.

The foregoing and/or other aspects and utilities of the present general inventive concept may also be achieved by providing an image forming apparatus having a plurality of developing units, including a control unit to determine a printable state of the plurality of developing units, to determine whether an auto color registration process (ACR) operation condition is satisfied, and to control an ACR operation or a printing operation, and a print engine unit to perform the ACR operation or the printing operation under the control of the control unit with respect to the developing units when the ACR operation condition is satisfied or when a printing operation is requested, respectively, wherein a normal ACR operation or printing operation is performed only when all of the plurality of developing units are in the printable state.

When at least one of the plurality of developing units is not in a printable state, the control unit may control the print engine unit to perform the ACR operation only with respect to the developing units in the printable state.

When at least one of the plurality of developing units is not in a printable state, the control unit may control the print engine unit to perform the printing operation only with respect to the developing units in the printable state.

When at least one of the plurality of developing units is not in a printable state, the control unit may request confirmation from a user to control the print engine unit to perform the ACR operation only with respect to the developing units in the printable state.

The control unit may determine the printable state of the plurality of developing units according to at least one of a residual quantity of toner in the developing unit, a removed or installed state of the developing unit, and a user selection to exclude a developing unit.

The image forming apparatus may further include a judging unit to determine whether the residual amount of toner in the plurality of developing units is below a predetermined amount and to report the determination to the control unit.

The judging unit may determine the residual amount of toner according to reflection rates of a density pattern corresponding to each of the developing units.

When at least one of the plurality of developing units is not in a printable state, the control unit may control the print engine unit to perform the ACR operation using a previous color registration adjustment value.

When at least one of the plurality of developing units is not in a printable state, the control unit may control the print engine to perform the printing operation using only one developing unit in the printable state.

The foregoing and/or other aspects and utilities of the present general inventive concept may also be achieved by providing a method to control an ACR operation of an image forming apparatus having a plurality of developing units, the method including determining which among the plurality of developing units are in a printable state, determining whether an ACR operation condition is satisfied, and controlling the image forming apparatus to perform the ACR operation with respect to only the developing units in the printable state.

The printable state of a developing unit may be determined according to at least one of a residual quantity of toner in the developing unit being above a predetermined threshold, an installed state of the developing unit, and a user selection to exclude a developing unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
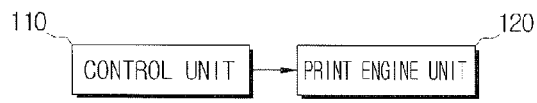
FIG. 1 is a block diagram illustrating a construction of an image forming device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a construction of an image forming device according to an embodiment of the present general inventive concept.

Referring to FIG. 1, the image forming device according to an embodiment of the present general inventive concept may include a control unit 110 and a print engine unit 120.

The control unit 110 determines whether to perform an auto color registration (ACR) with respect to a plurality of developing units provided in the image forming device. Specifically, the control unit 110 determines the developing units to perform the ACR based on a user's selection of the developing units, residual quantities of toner of the respective developing units, and attachment/detachment states of the developing units. That is, the control unit 110 excludes developing units of which the color is not selected by the user, developing units having insufficient residual quantities of toner, and developing units removed out of the image forming device, and performs the ACR with respect to the remaining developing units.

The print engine unit 120 performs the ACR using the developing units determined by the control unit 110 among the plurality of developing units. The detailed construction of the print engine unit 120 will be described with reference to FIG. 2.

Figure 2:
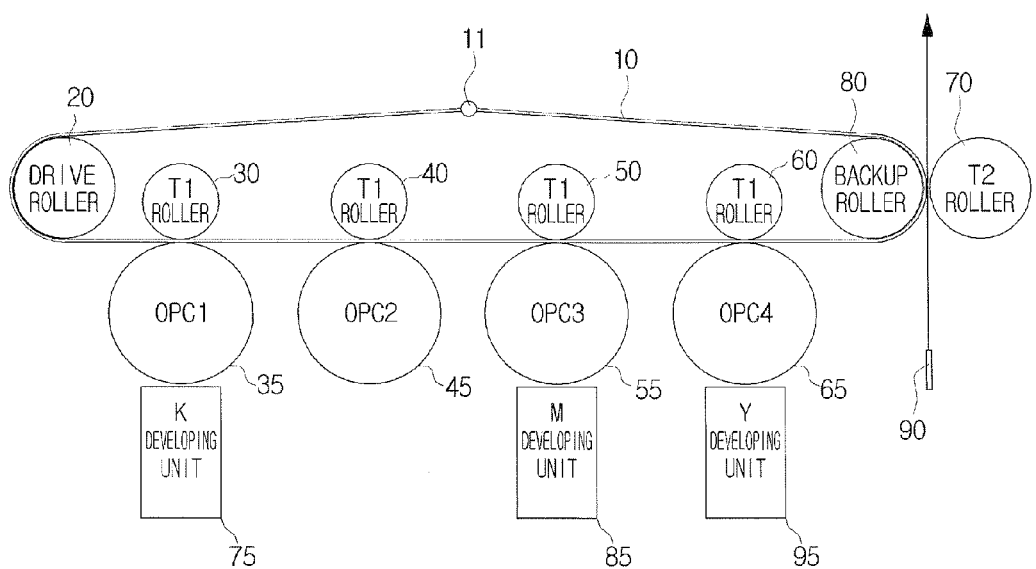
FIG. 2 is a schematic view illustrating a construction of a print engine unit applicable to the image forming device of FIG. 1 that performs a transfer work using a transfer belt when a C (Cyan) developing unit is excluded.

FIG. 2 is a schematic view illustrating the construction of a print engine unit applicable to the image forming device of FIG. 1 that performs a transfer work using a transfer belt when a C (Cyan) developing unit is excluded.

Referring to FIG. 2, the print engine unit 120 may include a transfer belt 10, a drive roller 20, four T1 transfer rollers 30, 40, 50, and 60, four organic photoconductive drums (OPC drums) 35, 45, 55, and 65, a T2 transfer roller 70, a T2 backup roller 80, and three developing units 75, 85, and 95.

Particularly, as illustrated in FIG. 2, a C (Cyan) developing unit may be removed from the print engine unit 120, and K (Black), M (Magenta), and Y (Yellow) developing units 75, 85, and 95 may be provided provided. Toners corresponding to K (Black), M (Magenta), and Y (Yellow) are attached through respective development processes to a latent image portion formed on the OPC drums 35, 55, and 65, respectively. Accordingly, even if the C developing unit is not provided, the developing process is performed with the remaining developing units except for the C (Cyan) developing unit, without displaying an error message such as "CRUM Not Installed" in a conventional manner.

The T1 transfer rollers 30, 40, 50, and 60 that correspond to the respective OPC drums 35, 45, 55, and 65, respectively, are formed along the transfer belt 10. Accordingly, the toners attached to surfaces of the respective OPC drums 35 to 65 are first transferred to a surface of the transfer belt 10 by the respective T1 transfer rollers 30 to 60. In this case, by recognizing a position mark 11 located on the transfer belt 10 and synchronizing the operation of the respective OPC drums 35 to 65 with the operation of the T1 transfer rollers 30 to 60, one color image is presented. Accordingly, the image formed on the transfer belt 10 is transferred to a printing medium 90 through a second transfer process between the T2 transfer roller 70 and the T2 backup roller 80. Meanwhile, the drive roller 20 serves to move the transfer belt 10 at a proper speed.

The print engine unit 120 forms a color registration pattern on the transfer belt 10 using the respective transfer rollers 30 to 60 and the respective OPC drums 35 to 65. Then, the print engine unit 120 matches a transfer timing of the respective transfer rollers 30 to 60 in accordance with a degree of misregistration among the formed color registration patterns. For example, if it is judged that the M-toner image is formed after an exact position, i.e., if it is judged that the forming of the M-toner image is delayed, the print engine unit 120 shortens the drive timing of the third T1 roller 50. By contrast, if it is judged that the M-toner image is formed before the exact position, i.e., if it is judged that the forming of the M-toner image precedes the exact position, the print engine unit 120 delays the drive timing of the third T1 roller 50.

As illustrated in FIG. 2, if at least one developing unit is initially missing among the plurality of developing units or any developing unit is removed during use, the developing unit is in an unprintable state, and thus the control unit 110 excludes determinations regarding the corresponding developing unit. As described above, the controller 110 can judge whether a print work and an ACR work using the print work can be performed in consideration of the user's selection, in addition to the residual quantities of toner of the respective developing units and the attachment/detachment of the respective developing units.

On the other hand, the print engine unit 120 performs the print work when a print command is inputted. In this case, the print engine unit 120 performs the print work using only the printable developing units, instead of reporting that the print work is impossible by outputting an error message like the conventional device. For example, if the print command is inputted in a state that the C (Cyan) developing unit is not provided in the print engine unit or the M developing unit has insufficient toner, the print is performed using the remaining toner only except for C or M color. Latent images are formed on the respective OPC drums 35 to 65 by scanning laser beams onto the respective OPC drums 35 to 65, and the development of an actual printing medium is performed using the remaining developing units except for the C developing unit or the M developing unit. Thereafter, toners of the Y and K colors, except for the C or M color, are superimposed on the printing medium 90, and then fused on the printing medium 90 through a fuser (not illustrated) to complete the print work.

If toner of a specified color is insufficient or if any developing unit is removed, the color representation is not normally performed. Accordingly, if even a single developing unit among the C, M, and Y developing units is removed, or even one color toner is insufficient, the print engine unit 120 may perform the print work using only the K developing unit 75.

Although C, M, Y, and K developing units are illustrated in FIG. 2, the number of developing units may differ according to embodiments of the present general inventive concept. For example, in addition to the C, M, Y, and K developing units, at least one of right C, right M, right K, dark gray, photo blue, and photo black developing units may be included. As described above, the developing units can be implemented using the existing developing units and developing units of which the colors can be used later.

Figure 3:
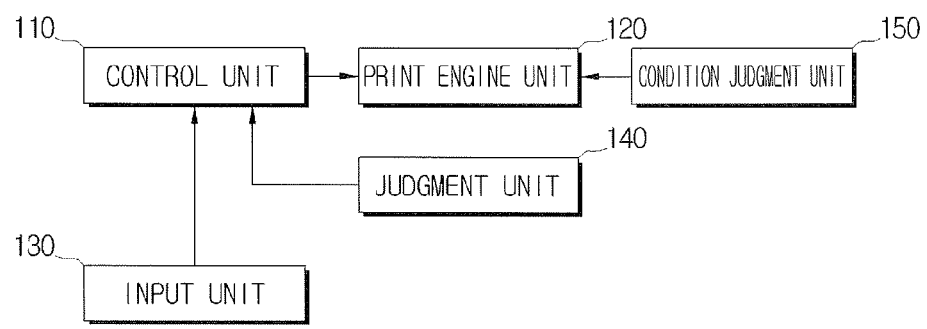
FIG. 3 is a block diagram illustrating a construction of an image forming device according to another embodiment of the present general inventive concept.

FIG. 3 is a block diagram illustrating a construction of an image forming device according to another embodiment of the present general inventive concept.

Referring to FIG. 3, the image forming device may include an input unit 130, a judgment unit 140, and a condition judgment unit 150, in addition to the control unit 110 and the print engine unit 120.

The judgment unit 140 judges whether the respective developing units are in a printable state. Specifically, the judgment unit 140 judges whether the respective developing units can normally print an ACR pattern by confirming the residual quantities of toner of the respective developing units.

In addition, the judgment unit 140 may judge whether the developing units are printable by confirming whether the developing units are installed and confirming whether the residual quantities of toner of the confirmed developing units are above a predetermined threshold value.

Specifically, the judgment unit 140 can confirm the residual quantities of toner of the respective developing units through CRUM attached to the respective developing units or memories provided outside the respective developing units. The residual quantity of toner is affected by a number of prints already performed, a number of print dots, and so forth. In this case, the residual quantities of toner of the respective developing units are confirmed, and thus if the quantities of toner of the C (Cyan) and M (Magenta) developing units are insufficient, the judgment unit 140 judges that the corresponding developing units are in an unprintable state.

The judgment unit 140 reports the result of judgment to the control unit 110, so that the control unit 110 can determine usable developing units.

The input unit 130 receives a user's selection of colors to be used, and reports the result of selection to the control unit 140.

The control unit 110 determines the printable developing units among the developing units corresponding to the colors selected through the input unit 130, and controls the print engine unit 120 to perform the ACR using the determined developing units. For example, if it is selected that the C (Cyan) color is not used through the input unit 130 and the residual quantity of toner of the M (Magenta) developing unit is below a reference threshold value, the control unit 110 additionally excludes the M (Magenta) developing unit of which the residual quantity of toner is below the reference threshold value from the developing units along with the C (Cyan) developing unit, and performs the ACR using only the Y (Yellow) and K (Black) developing units.

The condition judgment unit 150 judges whether an ACR execution condition is satisfied. Specifically, if the print work is continuously performed, a temperature inside a main body of the print engine unit increases, and thus, the drive roller expands to change a diameter of the drive roller. As a result, even if the drive roller rotates with the same revolutions, the moving speed of the transfer belt differs, and thus the ACR is required.

In addition, even if at least one developing unit among C (Cyan), M (Magenta), Y (Yellow), and K (Black) developing units is replaced, a position of the newly replaced developing unit may be distorted, and thus, the ACR is required in this case.

In addition, it may be preset to perform the ACR even in the case where a sleep mode in which no print is performed is maintained for a specified time, a cover of the main body is not open for a specified time, and a predetermined number of prints are printed.

The condition judgment unit 150 judges whether any one of ACR execution conditions is satisfied, and the print engine unit 120 performs the ACR according to the result of judgment. In other embodiments of the present general inventive concept, the above-described function of the condition judgment unit 150 may be performed by the control unit 110. Also, inside or outside the print engine unit 120, a color registration processing unit (not illustrated) to perform the ACR work may be separately provided.

Figure 4A:
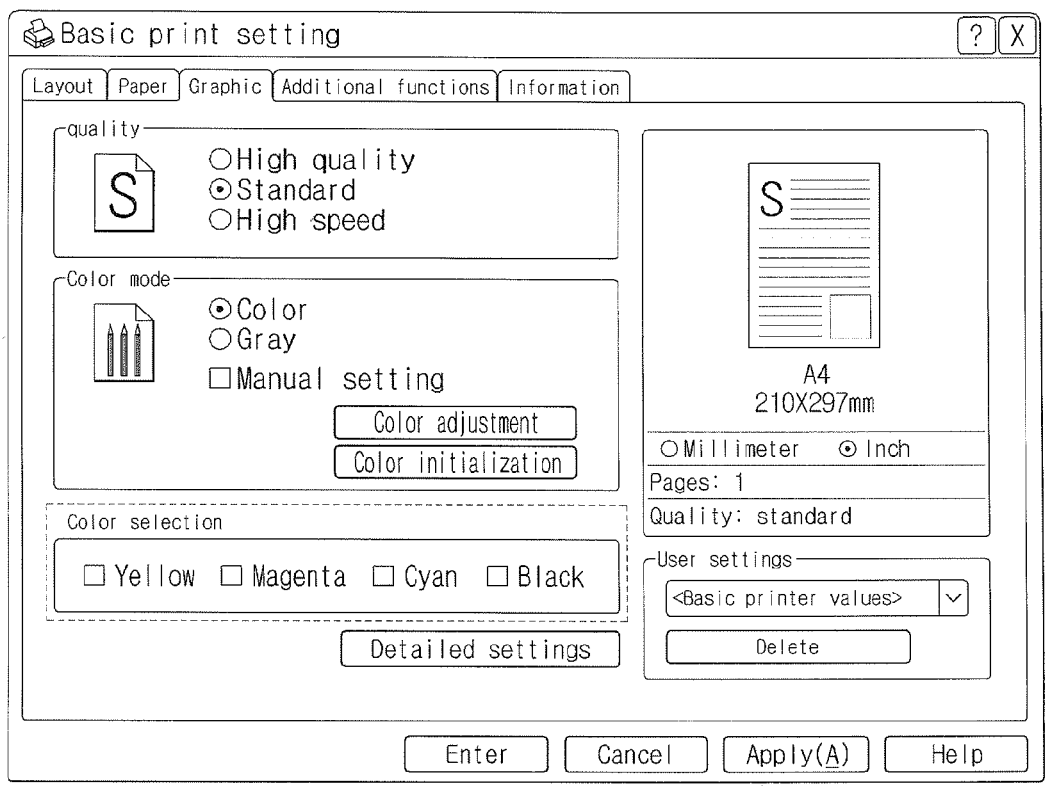
FIGS. 4A and 4B are views illustrating an example of an input unit applicable to the image forming device of FIG. 3 according to the present general inventive concept.
Figure 4B:
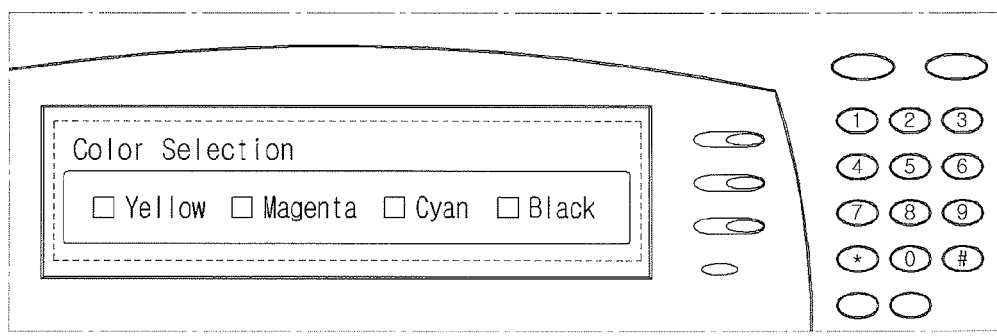

FIGS. 4A and 4B are views illustrating an example of the input unit 130 that is applicable to the image forming device of FIG. 3 according to the present general inventive concept.

Referring to FIG. 4A, the input unit 130 may receive a user's command through a window for basic print settings of a host (not illustrated). In FIG. 4A, "Color" may be selected as a color mode from a graphic tap of the window. If "Color" is selected as a color mode, colors to be used to print can be selected by selecting again at least one color among C (Cyan), M (Magenta), (Y (Yellow), and K (Black).

Referring to FIG. 4B, the user's command can be directly inputted through a user interface (UI) provided in the image forming device. Specifically, the user's command can be inputted through a manipulation panel and an LCD window provided in the image forming device. By selecting at least one color among C (Cyan), M (Magenta), Y (Yellow), and K (Black), the colors to be used to print can be selected by the user.

Although not illustrated in FIG. 4B, the input unit 130 of the image forming device according to the present general inventive concept may be provided with a touch screen type LCD window to receive an input of a user's color selection command.

On the other hand, in FIGS. 4A and 4B, it is exemplified that the colors to be used by the user are selectable. However, colors that are not used by the user may be inputted and selected instead.

If the unprintable developing unit is confirmed by the judgment unit 140, the input unit 130 may provide a UI to inquire whether the ACR is performed using only the printable developing units.

Specifically, if the residual quantity of toner of one developing unit is below the predetermined threshold value, and thus, the corresponding developing unit is judged as an unprintable developing unit by the judgment unit 140, the input unit 130 of the image forming device according to the present general inventive concept provides a UI for inquiring whether to continuously perform the printing and ACR instead of outputting an error message such as "CRUM Not Installed" or "Toner Empty".

Figure 5A:
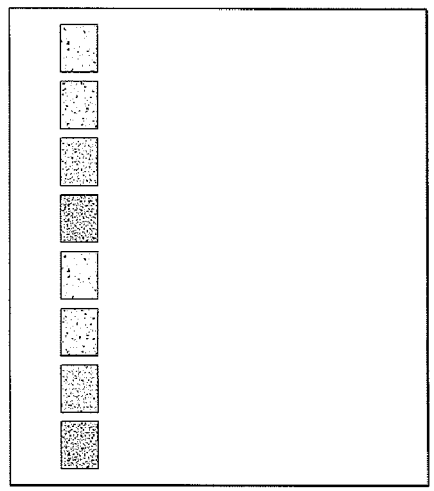
FIG. 5A is a view illustrating an example of a density pattern used in the image forming device according to the present general inventive concept.
Figure 5B:
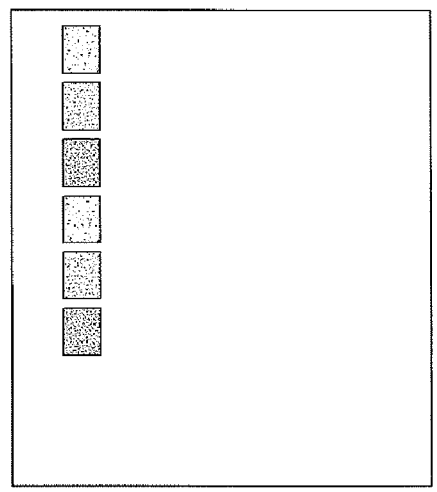
FIG. 5B is a view illustrating an example of a density pattern used in the image forming device when a C (Cyan) color is excluded.

FIG. 5A is a view illustrating an example of a density pattern used in the image forming device of FIG. 3 according to the present general inventive concept, and FIG. 5B is a view illustrating an example of a density pattern used in the image forming device when a C (Cyan) color is excluded.

Specifically, as illustrated in FIG. 5A, in a typical ACR process, the print engine unit 120 prints the density pattern as illustrated in FIG. 5A on the transfer belt for the C (Cyan), M (Magenta), Y (Yellow), and K (Black) developing units, and if a density value that is lower than a predetermined density is calculated, it is judged that the performing of the ACR is required.

The judgment unit 140 may judge the developing unit having insufficient toner by confirming the density pattern as illustrated in FIG. 5A. That is, the judgment unit confirms the toner densities of the respective colors by checking the reflection rate of the density pattern for respective colors, using light-emitting diodes and photodiodes. Accordingly, if the confirmed density is lower than the predetermined threshold density, the developing unit of the corresponding color may be excluded from the ACR work or print work.

On the other hand, referring to FIG. 5B, the control unit 110 performs a density pattern printing using only the remaining developing units judged by the judgment unit 140 to be printable, excluding the C (Cyan) developing unit.

Also, if a user's command to additionally exclude other developing units is inputted through the input unit 130, the density pattern of another color may be additionally excluded.

Figure 6A:
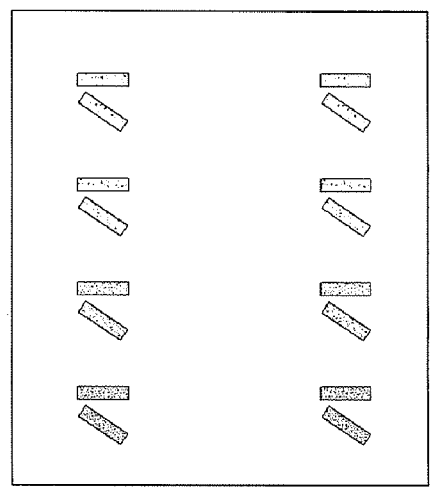
FIG. 6A is a view illustrating an example of a color registration pattern used in the image forming device according to the present general inventive concept.
Figure 6B:
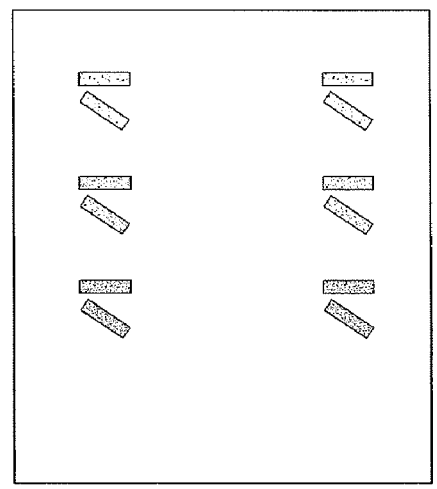
FIG. 6B is a view illustrating an example of a color registration pattern used in the image forming device when a C (Cyan) color is excluded.

FIG. 6A is a view illustrating an example of a color registration pattern used in the image forming device of FIG. 3 according to an embodiment of the present general inventive concept, and FIG. 6B is a view illustrating an example of a color registration pattern used in the image forming device when the C (Cyan) color is excluded.

Specifically, as illustrated in FIG. 6A, in a typical ACR process, the print engine unit 120 outputs the color registration pattern for the respective developing unit as illustrated in FIG. 6A to the transfer belt, and if a misregistration over a predetermined threshold value occurs in comparison to the existing output pattern, it may judge that performing of the ACR is required.

Referring to FIG. 6B, the printing of a color registration pattern is performed using only the remaining developing units judged as printable by the judgment unit 140 excluding the C (Cyan) developing unit.

Also, if a user's command to additionally exclude another developing unit is inputted through the input unit 130, another color registration pattern may be additionally excluded as illustrated in FIG. 6B.

On the other hand, the image forming device according to another embodiment of the present general inventive concept performs a printing work in the same manner as the image forming device that performs the ACR. In this case, if the print command is inputted, the print engine unit 120 performs the print work using only the printable developing units. Since other construction and function are similar as those of the image forming device that performs the ACR, the detailed description thereof will be omitted.

Figure 7:
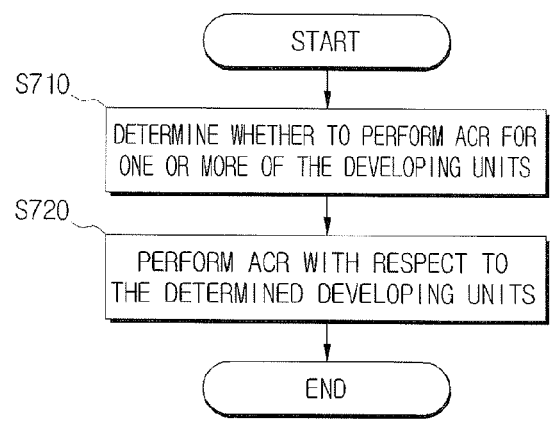
FIG. 7 is a flowchart illustrating an image forming method according to an embodiment of the present general inventive concept.

FIG. 7 is a flowchart illustrating an image forming method according to an embodiment of the present general inventive concept.

Referring to FIG. 7, in operation S710 whether to perform an ACR is determined for the respective developing units. The determination whether to perform the ACR may be made based on residual quantities of toner of the respective developing units, a user's selection of the developing units, and so forth. That is, developing units having insufficient residual quantities of toner or developing units of a color that a user sets not to use may be excluded, and the ACR may be performed using only the remaining developing units.

Then, in operation S720 the ACR work is performed with respect to the determined developing units.

On the other hand, if a print command is inputted in a state that the developing units to be used are determined, the print work may be performed using only the determined developing units.

Figure 8:
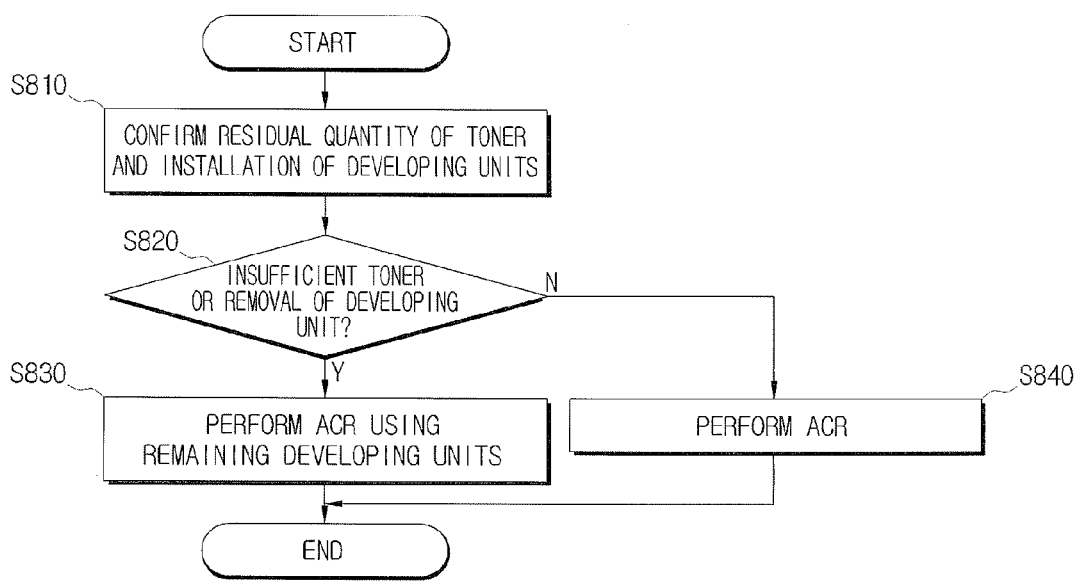
FIG. 8 is a flowchart illustrating in detail a method of performing an ACR by determining developing units according to residual quantities of toner in the image forming method according to the present general inventive concept.

FIG. 8 is a flowchart illustrating in detail a method of performing an ACR by determining developing units according to residual quantities of toner in the image forming method according to the present general inventive concept.

Referring to FIG. 8, in operation S810 the residual quantities of toner and whether the developing units are provided are confirmed, and in operation S820 it is judged whether developing units having insufficient residual quantities of toner exist or whether at least one developing unit of the plurality of developing units is removed.

If the residual quantity of toner is below a predetermined threshold value or at least one developing unit of the plurality of developing units is removed, in operation S830 the ACR is performed using the remaining developing units except for the removed developing unit or the developing unit having insufficient residual quantity of toner. By contrast, if the residual quantity of toner is above the predetermined threshold value or no developing unit is removed, in operation S840 the ACR is performed with respect to all the developing units.

Figure 9:
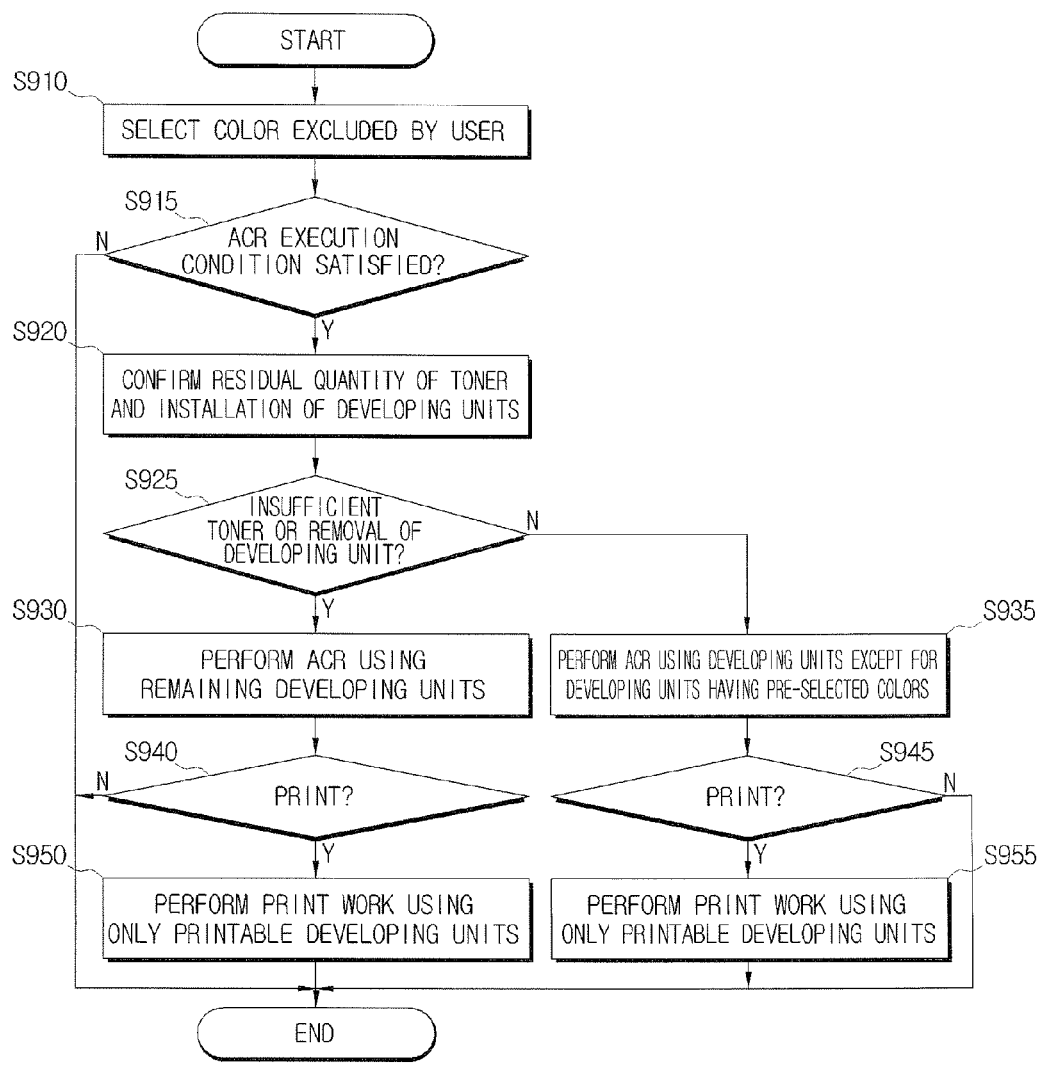
FIG. 9 is a flowchart generally illustrating a method of determining developing units even in consideration of a user's selection and performing an ACR accordingly.

FIG. 9 is a flowchart generally illustrating a method of determining developing units even in consideration of a user's selection and performing an ACR accordingly.

Referring to FIG. 9, in operation S910 the colors that will not be used during the printing are selected by a user.

In operation S915 it is judged whether an ACR execution condition is satisfied. If the ACR execution condition is satisfied as a result of judgment, in operation S920 the residual quantities of toner for the plurality of developing units and whether the developing units are installed are confirmed.

In operation S925 it is judged whether the residual quantity of toner of at least one developing unit among the plurality of developing units is below the predetermined threshold value, or at least one developing unit of the plurality of developing units is removed.

If the residual quantity of toner of at least one developing unit among the plurality of developing units is below the predetermined threshold value or if at least one developing unit of the plurality of developing units is removed as a result of judgment, in operation S930 the ACR is performed using the remaining developing units, while excluding the developing units having insufficient amount of toner or the removed developing units. In other words, the ACR is performed using the remaining developing units, while excluding the developing unit that represents the color selected in operation S910 and the developing units not in a printable state.

On the other hand, in operation S925, if the residual quantity of toner of the plurality of developing units is above the predetermined threshold value and no developing unit is removed as a result of judgment, in operation S935 the ACR is performed using the developing unit of which the color is selected in operation S910.

In operation S940 and S945, it is judged whether to perform print work operations S930 and S935.

If it is intended to perform the print work as a result of judgment, in operation S950 and S955, the print work is performed using only the printable developing units among the plurality of developing units.

Figure 10:
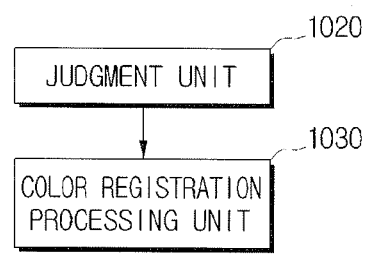
FIG. 10 is a block diagram illustrating a construction of an image forming device according to an embodiment of the present general inventive concept.

FIG. 10 is a block diagram illustrating the construction of an image forming device according to an embodiment of the present general inventive concept.

The image forming device of FIG. 10 may include a judgment unit 1020 and a color registration processing unit 1030.

The judgment unit 1020 judges whether an ACR work can be normally performed by confirming information on residual quantities of toner. Specifically, the judgment unit 1020 judges whether the ACR pattern is outputted with a normal density and the registration value can be accurately calculated. That is, the judgment unit 1020 confirms information on the residual quantity of toner, and if the residual quantity of toner is above a predetermined threshold value, it judges that the normal output of the ACR pattern is possible, while if the residual quantity of toner is below the predetermined threshold value, it judges that the normal output of the ACR pattern is impossible. In this case, the judgment unit 1020 may read the pre-stored information on the residual quantity of toner, or may directly confirm the residual quantity of toner remaining in a toner cartridge using a sensor.

The color registration processing unit 1030 performs the ACR work. Also, the color registration processing unit 1030 performs the ACR work using a density pattern and an ACR pattern. Specifically, details of the color registration processing unit 1030 will be described with reference to FIGS. 11 and 12.

Figure 11:
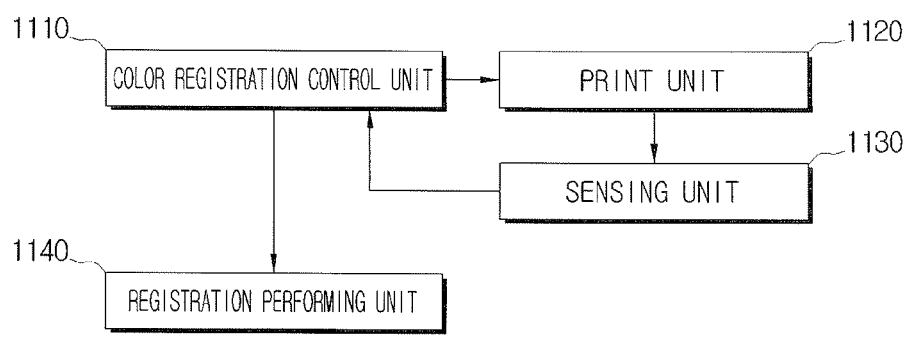
FIG. 11 is a block diagram illustrating an example of the construction of a color registration processing unit applicable to the image forming device of FIG. 10.

FIG. 11 is a block diagram illustrating an example of a construction of a color registration processing unit applicable to the image forming device of FIG. 10.

Referring to FIG. 11, the color registration processing unit 1030 may include a color registration control unit 1110, a print unit 1120, a sensing unit 1130, and a registration performing unit 1140. If the ACR condition is satisfied in a state that the image forming device performs a general operation, such as an image printing, it is switched over to an ACR performing state, and thus the color registration processing unit 1030 performs the ACR work.

That is, if the image forming device is switched over to the ACR state, the color registration control unit 1110 controls the print unit 1120 to output a color registration pattern to a transfer belt. If the color registration pattern is outputted to the transfer belt, the sensing unit 1130 senses a degree of misregistration among the color registration patterns. The color registration control unit 1110 calculates the registration value from the resultant value of sensing, and controls the registration performing unit 1140 to perform the correction according to the calculated registration value. Accordingly, the registration performing unit 1140 corrects data by an ACR algorithm. If the data correction is completed, the color registration control unit 1110 ends the ACR state, and the image forming device is switched over to an image printing state.

Figure 12:
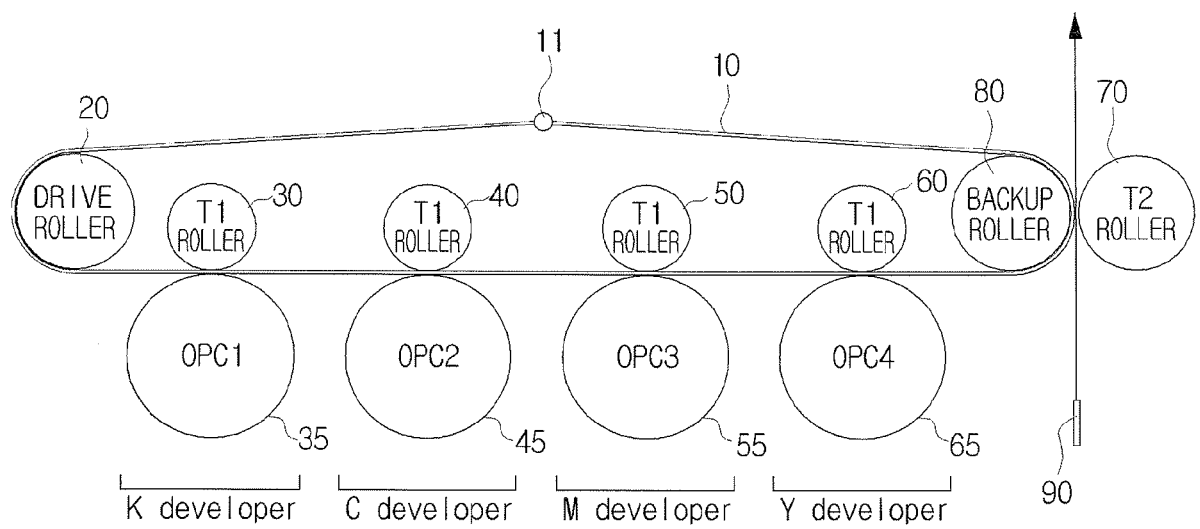
FIG. 12 is a schematic view illustrating an example of a construction of a print unit applicable to the image forming device of FIG. 10 that performs a transfer work using a transfer belt.

FIG. 12 is a schematic view illustrating an example of a construction of a print unit 1120 applicable to the image forming device of FIG. 11 that performs a transfer work using a transfer belt.

Referring to FIG. 12, the print unit 1120 may include a transfer belt 10, a drive roller 20, four T1 transfer rollers 30, 40, 50, and 60, four organic photoconductive drums (OPC drums) 35, 45, 55, and 65, a T2 transfer roller 70, and a T2 backup roller 80.

Toners corresponding to C (Cyan), M (Magenta), Y (Yellow), and K (Black) are attached through respective development processes to a latent image portion formed on the OPC drums 35 to 65. In FIG. 12, the illustration of developing units is omitted.

The T1 transfer rollers 30 to 60 that correspond to the respective OPC drums 35 to 65 are formed along the transfer belt 10. Accordingly, the toners attached to surfaces of the respective OPC drums 35 to 65 are first transferred to a surface of the transfer belt 10 by the respective T1 transfer rollers 30 to 60. In this case, by recognizing a position mark 11 located on the transfer belt 10 and synchronizing an operation of the respective OPC drums 35 to 65 with the operation of the T1 transfer rollers 30 to 60, one color image is presented. Accordingly, the color image formed on the transfer belt 10 is transferred to a printing medium 90 through a second transfer process between the T2 transfer roller 70 and the T2 backup roller 80. Meanwhile, the drive roller 20 serves to move the transfer belt 10 at a proper speed.

If a registration period that corresponds to the present operation mode arrives in a state that the print unit 1120 is constructed as illustrated in FIG. 12, the color registration processing unit 1030 forms a color registration pattern on the transfer belt 10 using the respective transfer rollers 30 to 60 and the respective OPC drums 35 to 65. Then, the color registration processing unit 1030 matches the transfer timing of the respective transfer rollers 30 to 60 in accordance with the degree of misregistration among the formed color registration patterns. For example, if it is judged that the C-toner image is formed after an exact position, i.e., if it is judged that the forming of the C-toner image is delayed, the color registration processing unit 1030 shortens a drive timing of the second T1 roller 40. By contrast, if it is judged that the C-toner image is formed before the exact position, i.e., if it is judged that the forming of the C-toner image precedes the exact position, the color registration processing unit 1030 delays the drive timing of the second T1 roller 40. As described above, the color registration processing unit 1030 controls the print unit 1120 to form the color registration pattern set for a predetermined time whenever the ACR execution condition is satisfied, and performs the color registration work by comparing the color registration patterns with each other.

Figure 13:
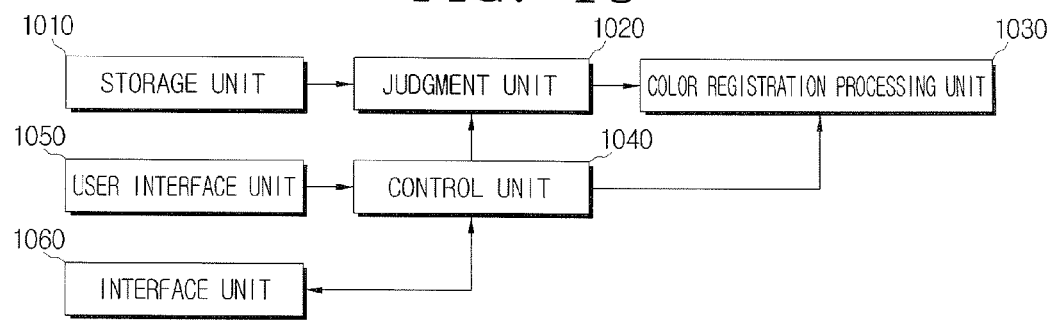
FIG. 13 is a block diagram illustrating a construction of an image forming device according to another embodiment of the present general inventive concept.

FIG. 13 is a block diagram illustrating a construction of an image forming device according to another embodiment of the present general inventive concept.

The image forming device according to another embodiment of the present general inventive concept may further include a storage unit 1010, a control unit 1040, a user interface unit 1050, and an interface unit 1060, in addition to the judgment unit 1020 and the color registration processing unit 1030.

The storage unit 1010 stores information on residual quantities of toner. Specifically, the storage unit 1010 may be attached to a main body, a developing unit, or a toner bottle. The information on the residual quantities of toner may be information directly indicating the residual quantities of toner stored in the storage unit 1010, or may be information, such as a number of pre-performed prints that affect the residual quantity of toner, or a number of print dots. The information on the residual quantities of toner may be stored in the storage unit 1010, or may be directly measured from the respective development units without being stored in the storage unit 1010.

The control unit 1040 judges whether an ACR execution condition is satisfied.

Specifically, if print work is continuously performed, a temperature inside a main body is increased, and thus, the drive roller expands to change a diameter of the drive roller. As a result, even if the drive roller rotates with the same revolutions, a moving speed of a transfer belt differs, and thus, the ACR is required.

In addition, even if at least one developing unit among C (Cyan), M (Magenta), Y (Yellow), and K (Black) developing units is replaced, a position of the newly replaced developing unit may be distorted, and thus the ACR is required in this case.

In addition, it may be preset to perform the ACR even in the case where a sleep mode in which no print is performed is maintained for a specified time, or a cover of the main body is not opened for a specified time.

The color registration processing unit 1030 may perform the color registration using a previous color registration adjustment value, i.e., lately updated color registration adjustment value if it is judged that the normal output of the ACR pattern is impossible. Also, the color registration processing unit 1030 ends the ACR if an ACR stop command is inputted from a user in a state that the normal output of the ACR pattern is judged to be impossible.

The previous color registration adjustment value may be a value determined based on data of the ACR that has been performed most recently.

On the other hand, the user interface unit 1050 may receive a user's input of whether to perform the ACR. Specifically, if it is judged that the normal output of the ACR pattern is impossible by the judgment unit 1020, the user interface unit 1050 provides a user interface window to receive a user's input of whether to perform the ACR.

The interface unit 1060 provides the user interface window to inquire whether to perform the ACR to a host PC. Specifically, if it is judged that the normal output of the ACR pattern is impossible by the judgment unit 1020, the interface unit 1060 provides the user interface window to the host PC.

If a user's command not to use ACR is inputted through the user interface unit 1050 or the interface unit 1060, the control unit 1040 controls the color registration processing unit 1030 to perform the color registration using the previous or lately updated color registration adjustment value.

If it is judged that the ACR pattern is to be normally outputted through the judgment of information on the residual quantity of toner stored in the storage unit 1010 or directly measured, the judgment unit may judge once again whether the residual quantity of toner is sufficient by outputting a density pattern on the transfer belt. If the toner density of the density pattern outputted to the transfer belt is below the predetermined threshold density value, the color registration may be performed using the updated color registration adjustment value.

Figure 14A:
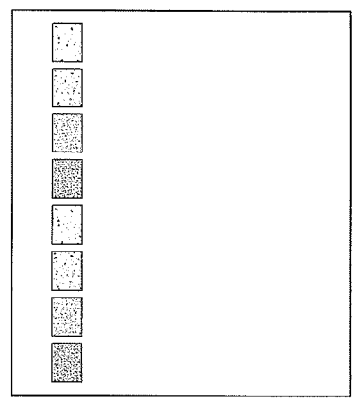
FIG. 14A is a view illustrating an example of a density pattern used in the image forming device of FIG. 13 according to the present general inventive concept.
Figure 14B:
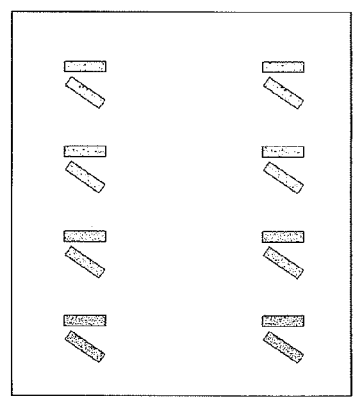
FIG. 14B is a view illustrating an example of a color registration pattern used in the image forming device of FIG. 13 according to the present general inventive concept.

FIG. 14A is a view illustrating an example of a density pattern used in the image forming device of FIG. 13 according to the present general inventive concept, and FIG. 14B is a view illustrating an example of a color registration pattern used in the image forming device according to the present general inventive concept.

If the density value that is lower than the predetermined density is calculated through the printing of the density pattern as illustrated in FIG. 14A on a paper transfer belt (PTB) or an intermediate transfer belt (PTB) for the C, M, Y, and K developing units, the image forming device judges that the performing of the ACR is required.

Also, the image forming device outputs the color registration pattern as illustrated in FIG. 14B to the paper transfer belt or intermediate transfer belt, and if the misregistration over the predetermined threshold value occurs in comparison to the existing output pattern, it may judge that performing of the ACR is required.

Figure 15:
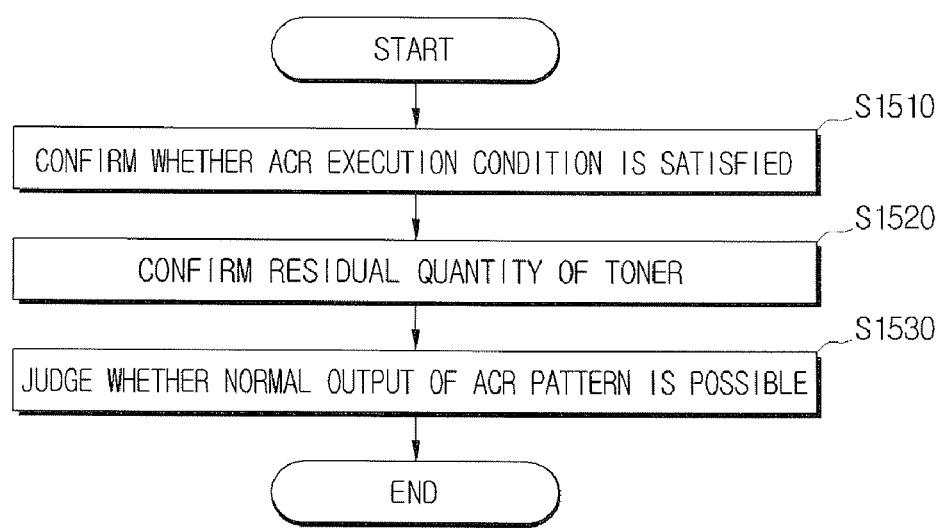
FIG. 15 is a flowchart illustrating a color registration method according to an embodiment of the present general inventive concept.
Figure 16:
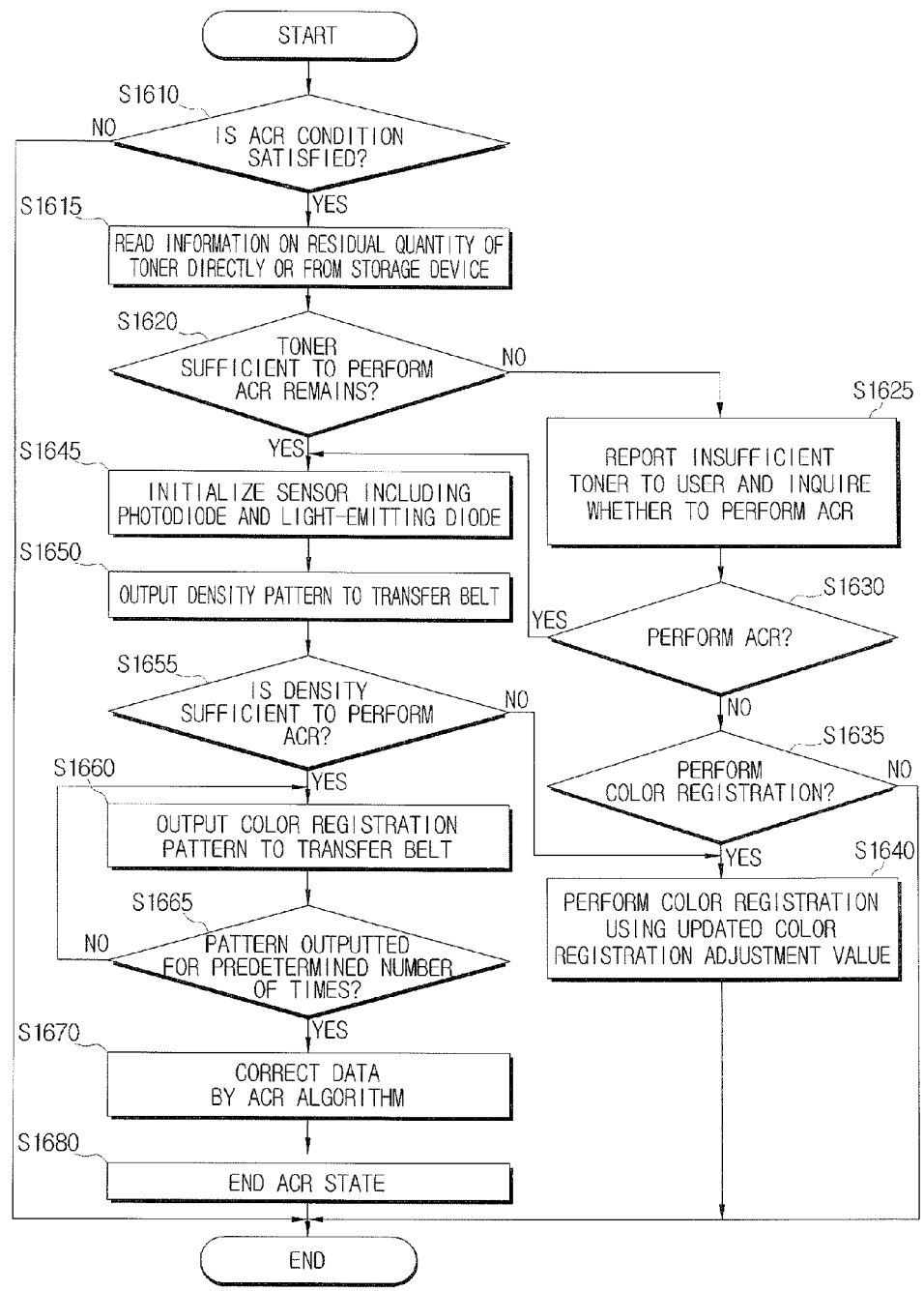
FIG. 16 is a flowchart illustrating in detail the color registration method of FIG. 15.

FIG. 15 is a flowchart illustrating a color registration method according to an embodiment of the present general inventive concept, and FIG. 16 is a flowchart illustrating in detail the color registration method of FIG. 15.

Referring to FIG. 15, according to the color registration method, in operation S1510 it is confirmed whether an ACR execution condition is satisfied, in operation S1520 the residual quantity of toner is confirmed, and then, in operation S1530 it is judged whether the ACR pattern can be normally outputted according to the result of confirming the residual quantity of toner.

Referring to FIG. 16, in operation S1610 it is judged whether an ACR execution condition is satisfied.

If it is judged that the ACR execution condition is satisfied, in operation S1615 information on residual quantity of toner is read. In this case, the information on the residual quantity of toner can be read directly or from a memory provided in the main body or CRUM in the developing cartridge.

In operation S1620 it is judged whether the normal output of the ACR pattern is possible by comparing the read information on the residual quantity of toner with the pre-stored information on the residual quantity of toner.

If the normal output of the ACR pattern is impossible as a result of judgment, in operation S1625 it is reported to the user that the toner is insufficient to perform the ACR, and input on whether to perform the ACR is received, and then in operation S1630 it is judged whether to perform the ACR according to the user's input. If a command not to perform the ACR is inputted from the user, in operation S1635 it is judged whether to perform the color registration. If a command to perform the ACR is inputted from the user, in operation S1640 the color registration is performed using the lately updated color registration adjustment value. On the other hand, it is judged whether to perform the ACR, and if a command to stop the performing of the color registration is inputted from the user, the ACR is ended.

On the other hand, in operation S1620 if it is judged that the normal output of the ACR pattern is possible, in operation S1645 a sensor including a photodiode and a light-emitting diode is initialized.

After the sensor is initialized, in operation S1650 the density pattern is outputted to the paper transfer belt or intermediate transfer belt, and in operation S1655 it is judged whether the output density pattern indicates a density sufficient to perform the ACR through the sensor.

Specifically, in operation S1650 by outputting the density pattern to the paper transfer belt or intermediate transfer belt, in operation S1655 it can be confirmed whether the residual quantity of toner is sufficient to perform the ACR. If the residual quantity of toner is not sufficient, a pattern having a density value lower than the predetermined density is outputted to the paper transfer belt or intermediate transfer belt, and thus the size of the reflected light that is sensed by the sensor is decreased. Accordingly, it is judged whether the density is sufficient to normally perform the ACR based on the sensed value. On the other hand, the output density pattern can be changed to a certain pattern by the user.

If the density is not sufficient to perform the ACR as a result of judgment, in operation S1640 the color registration is performed using the lately updated color registration adjustment value.

On the other hand, if the density is sufficient to perform the ACR, in operation S1660 the color registration pattern is outputted to the paper transfer belt or intermediate transfer belt.

Then, in operation S1665 it is judged whether the color registration pattern is outputted for a predetermined number of times (e.g., N times) to calculate the data.

If the color registration pattern is not outputted for a predetermined number of times (e.g., N times) as a result of judgment, the process returns to the operation S1660 to calculate an accurate data value, and the color registration pattern is outputted to the transfer belt.

By contrast, if the color registration pattern is outputted for a predetermined number of times (e.g., N times) in operation S1670 data is corrected by the ACR algorithm, and in operation S1680 the ACR state is ended.

According to the present general inventive concept, even when a single developing unit among the plurality of developing units is missing or when the residual quantity of toner of one developing unit is below the predetermined threshold value, the ACR is performed along with the printing, instead of issuing an error message, and thus improved printing and ACR operations are provided.

Furthermore, user convenience is improved, because user is enabled to input colors he does not want to use in advance and the printing and ACR operations are performed while excluding the colors selected by the user.

Furthermore, if the ACR is not performed due to insufficient amount of the residual toner, color registration is performed using the previous or lately updated color registration adjustment value. Because unnecessary ACR operations are skipped, use of toner for density pattern and ACR pattern output can be reduced, and the user inconvenience of having to perform ACR during the printing can be reduced, and as a result, the overall quality of the set increases.

In addition, the user can determine whether to perform the ACR in the case where the residual quantity of toner is insufficient, and thus the user's range of options increases.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device having a plurality of developing units, comprising:
   a control unit to determine which one or more developing units is to form an auto color registration (ACR) pattern from among the plurality of developing units; and
   a print engine unit to perform an ACR of the determined one or more developing units.

2. The image forming device of claim 1, wherein the control unit determines whether to form the ACR pattern with the determined one or more developing units by confirming at least one of a user's selection of the plurality of developing units and a residual quantity state of toner of the plurality of developing units.

3. The image forming device of claim 2, further comprising:
   a judgment unit to judge whether printing of the ACR pattern for the respective determined one or more developing units is possible by confirming the residual quantities of toner of the respective determined one or more developing units, and reporting a result of judgment to the control unit.

4. The image forming device of claim 2, further comprising:
   an input unit to receive developer information the color of which is not to be used during the ACR with respect to the respective determined one or more developing units and reporting the received developer information to the control unit.

5. The image forming device of claim 4, further comprising:
   a judgment unit to judge whether printing of the ACR pattern is possible by confirming at least one of the residual quantities of toner of the respective determined one or more developing units and an attachment/detachment state of the respective determined one or more developing units, and reporting a result of judgment to the control unit,
   wherein the input unit provides a user interface (UI) to inquire whether to perform the ACR using only the printable developing units, when it is confirmed by the judgment unit that the developing unit is in an unprintable state.

6. The image forming device of claim 1, further comprising:
   a condition judgment unit to judge whether an ACR execution condition is satisfied.

7. The image forming device of claim 1, wherein the plurality of developing units comprise four or more developing units.

8. An image forming device, comprising:
   a judgment unit to judge whether residual quantities of toners of respective developing units are sufficient to form an auto color registration (ACR) pattern; and
   a color registration processing unit to perform an ACR work for any selection of one or more of the developing units if it is judged that the residual quantities of toner of at least the selected one or more of the developing units are sufficient.

9. The image forming device of claim 8, further comprising:
   a control unit to judge whether a predefined ACR execution condition is satisfied and to control the judgment unit to judge whether the residual quantities of the toners of the respective developing units are sufficient if the ACR execution condition is satisfied.

10. The image forming device of claim 8, wherein the color registration processing unit performs a color registration using a previous color registration adjustment value if it is judged that the residual quantity of toner of at least one of the selected developing units is not sufficient.

11. The image forming device of claim 8, wherein the color registration processing unit ends the ACR if an ACR stop command is inputted from a user in a state that the residual quantity of toner of at least one of the selected developing units is not sufficient.

12. The image forming device of claim 8, wherein the judgment unit judges that the residual quantities of the toners of the respective developing units are sufficient if the residual quantities of the toners are each above a predetermined threshold value, and that the residual quantities of the toners of the respective developing units are not sufficient if the residual quantities of at least one of the toners is below the threshold value.

13. The image forming device of claim 8, further comprising:
   a user interface unit to provide a user interface window to inquire whether to perform the ACR if it is judged that the residual quantity of toner of at least one of the developing units is not sufficient.

14. The image forming device of claim 8, further comprising:
   an interface unit to provide a user interface window to inquire whether to perform the ACR to a host PC if it is judged that the residual quantity of toner of at least one of the developing units is not sufficient.

15. An image forming method for an image forming device having a plurality of developing units, the method comprising:
   determining which one or more developing units is to form an auto color registration (ACR) pattern from among the plurality of developing units; and
   performing an ACR of the determined developing units.

16. The image forming method of claim 15, further comprising:
   judging whether printing of the ACR pattern for the respective determined one or more developing units is possible by confirming the residual quantities of toner of the respective determined one or more developing units.

17. The image forming method of claim 16, further comprising:
   providing a user interface (UI) to inquire whether to performs the ACR using only the printable developing units when the developing unit that is in an unprintable state is confirmed.

18. The image forming method of claim 16, further comprising:
   receiving developer information the color of which is not to be used during the ACR with respect to the respective determined one or more developing units.

19. The image forming method of claim 15, further comprising:
   judging a condition whether an ACR execution condition is satisfied.

20. An image forming method comprising:
   confirming whether an auto color registration (ACR) execution condition is satisfied;
   confirming residual quantities of toners of respective developing units of a plurality of developing units;

judging whether a normal output of an ACR pattern is possible according to a result of confirming the residual quantities of the toners; and performing an ACR with respect to any selection of one or more of the respective developing units having residual quantities of the toners if it is judged that the normal output of the ACR pattern is impossible.

21. The image forming method of claim 20, further comprising:

performing a color registration using a previous color registration adjustment value when it is judged that the normal output of the ACR pattern is impossible.

22. The image forming method of claim 20, further comprising:

ending the ACR when an ACR stop command is inputted from a user in a state that the normal output of the ACR pattern is judged to be impossible.

23. An image forming apparatus having a plurality of developing units, comprising:

a control unit to determine a printable state of the plurality of developing units, to determine whether an auto color registration process (ACR) operation condition is satisfied, and to control an ACR operation or a printing operation with respect to any selection of one or more developing units of the plurality of developing units in the printable state if at least one of the plurality of developing units is not in a printable state; and a print engine unit to perform the ACR operation or the printing operation under the control of the control unit with respect to the developing units when the ACR operation condition is satisfied or when a printing operation is requested, respectively.

24. The image forming apparatus of claim 23, wherein when at least one of the plurality of developing units is not in a printable state, the control unit controls the print engine unit to perform the ACR operation only with respect to the developing units in the printable state.

25. The image forming apparatus of claim 23, wherein when at least one of the plurality of developing units is not in a printable state, the control unit controls the print engine unit to perform the printing operation only with respect to the developing units in the printable state.

26. The image forming apparatus of claim 23, wherein when at least one of the plurality of developing units is not in a printable state, the control unit requests confirmation from a user to control the print engine unit to perform the ACR operation only with respect to the developing units in the printable state.

27. The image forming apparatus of claim 23, wherein the control unit determines the printable state of the plurality of developing units according to at least one of a residual quantity of toner in the developing unit, a removed or installed state of the developing unit, and a user selection to exclude a developing unit.

28. The image forming apparatus of claim 23, further comprising:

a judging unit to determine whether the residual amount of toner in the plurality of developing units is below a predetermined amount and to report the determination to the control unit.

29. The image forming apparatus of claim 28, wherein the judging unit determines the residual amount of toner according to reflection rates of a density pattern corresponding to each of the developing units.

30. The image forming apparatus of claim 23, wherein when at least one of the plurality of developing units is not in a printable state, the control unit controls the print engine unit to perform the ACR operation using a previous color registration adjustment value.

31. The image forming apparatus of claim 23, wherein when at least one of the plurality of developing units is not in a printable state, the control unit controls the print engine to perform the printing operation using only one developing unit in the printable state.

32. A method to control an ACR operation of an image forming apparatus having a plurality of developing units, the method comprising:

determining which one or more developing units among the plurality of developing units are in a printable state;

determining whether an ACR operation condition is satisfied; and controlling the image forming apparatus to perform the ACR operation with respect to only the one or more developing units in the printable state.

33. The method of claim 32, wherein the printable state of a developing unit is determined according to at least one of a residual quantity of toner in the developing unit being above a predetermined threshold, an installed state of the developing unit, and a user selection to exclude a developing unit.

* * * * *